United States Patent [19]

Murakami et al.

[11] 3,908,280
[45] Sept. 30, 1975

[54] ROLLER DRIVE-TYPE COMPOUND VEHICLE WHEEL ALIGNMENT TESTER

[75] Inventors: Kunihiko Murakami, Tokyo; Reiken Kaneda, Kawasaki, both of Japan

[73] Assignee: Banzai Jidosha Kabushiki Kaisha, Tokyo, Japan

[22] Filed: Nov. 12, 1973

[21] Appl. No.: 415,173

[30] Foreign Application Priority Data
July 24, 1973   Japan.............................. 48-82662

[52] U.S. Cl. ............................................. 33/203.13
[51] Int. Cl.² .......................................... G01B 3/12
[58] Field of Search........ 33/203.13, 203.12, 203.14

[56] References Cited
UNITED STATES PATENTS
3,305,935   2/1967   Cady et al........................ 33/203.13
3,546,782   12/1970   Pereue et al..................... 33/203.13

*Primary Examiner*—William D. Martin, Jr.
*Attorney, Agent, or Firm*—Holman & Stern

[57] ABSTRACT

A roller drive-type compound wheel alignment tester for simultaneous measurement of toe-in and camber angles of vehicle wheels having detection rollers adapted to rotate in contact with sides of the wheels, said tester comprising a pair of wheel alignment units each of which includes toe-in detection rollers and camber detection rollers supported on a cross-shaped support member with the projection of the axes of said toe-in detection rollers intersecting the projection of the axes of said camber detection rollers and with said projections of the axes of the toe-in and camber detection rollers intersecting the axis of one vehicle wheel, a horizontally movable frame supporting said detection roller support member for movement toward and away from said vehicle wheel together therewith so as to bring said detection rollers into contact with said wheel and separate the rollers from the wheel, means for indicating inclination of said roller support member with respect to said horizontally movable frame, and means for indicating horizontal rotation angle of said roller support member with respect to the horizontally movable frame.

3 Claims, 8 Drawing Figures

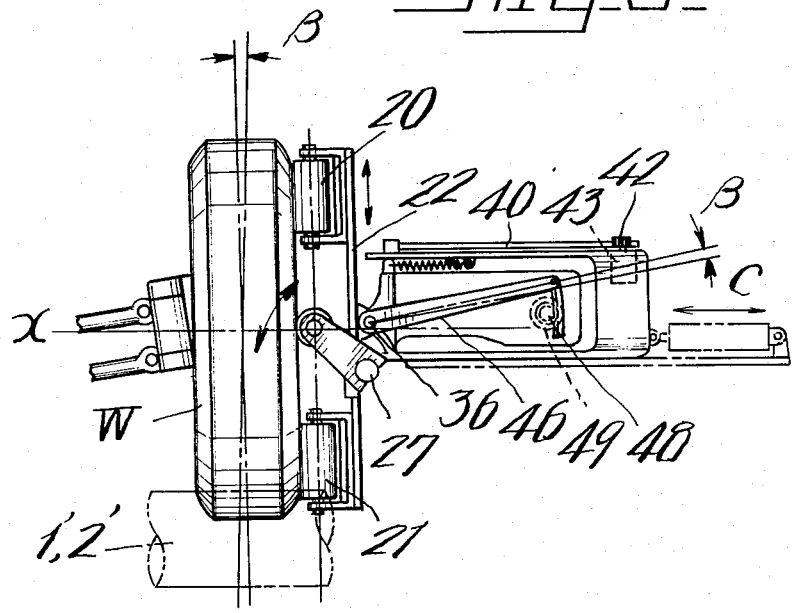
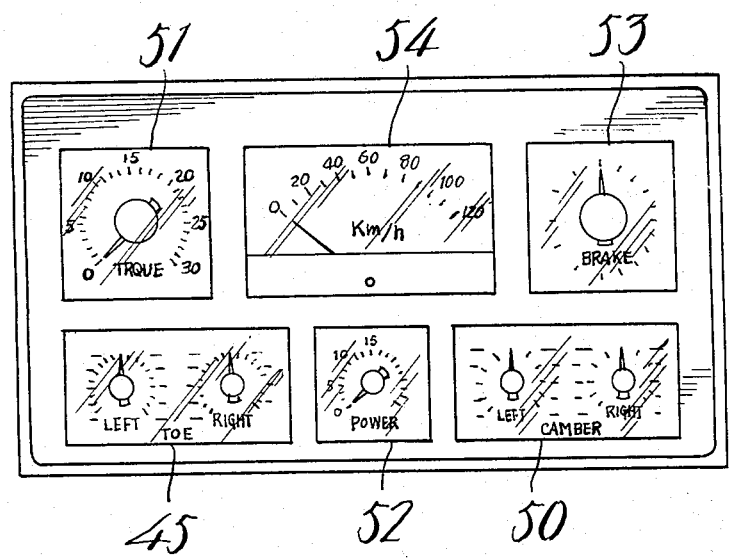

ROLLER DRIVE-TYPE COMPOUND VEHICLE WHEEL ALIGNMENT TESTER

BACKGROUND OF THE INVENTION

This invention relates to a wheel alignment tester and more particularly, to a roller drive-type compound wheel alignment device.

As one of the conventional methods for measuring the camber angle of a vehicle wheel without rotating the wheel, the so-called static measuring method is known in which a bubble-type gage is directly applied to the wheel to directly measure inclination of the wheel. As an alternative conventional method for statically measuring such angle of a vehicle wheel, a projector is mounted on one side of the wheel to be measured and the spotlight from the projector is focussed onto a chart positioned in front of the wheel.

A second camber angle measuring method is known as the dynamic measuring method in which a vehicle wheel to be measured is placed onto rotating rollers to impart rotation to the wheel and the rotating rollers are tilted until thrust force in the rollers which is generated due to the fact that the axis of the wheel is not parallel to the axes of the rollers is reduced to zero whereupon the inclination angle of the rollers is measured as the camber angle of the wheel.

The first camber measuring method or the so-called static measuring method is characterized in that the camber angle of the wheel is measured while the wheel is at rest and the method has the disadvantage that an average camber angle can not be obtained. On the other hand, although the second or dynamic measuring method is advantageous over the static measuring method because the second method makes it possible to measure camber angle of a wheel while the wheel is rotating, the dynamic measuring method is disadvantageous in that in order to measure the camber angle of a wheel, a dynamically measured camber angle value is first converted into a thrust force corresponding to the camber angle and the thrust force is then converted into a camber angle value which renders it impossible to obtain a highly precise measurement result.

For measuring toe-in amount, substantially the same methods as those described in connection with the camber angle measuring methods described hereinabove have been followed.

A conventional toe-in measuring method has been the so-called static measuring method in which the distance between the front parts of the vehicle front wheels and that between the rear parts of the same front wheels are directly measured by a scale to obtain the toe-in amount of the wheels.

In such a conventional dynamic toe-in amount measuring method, it is known that, just as in the above-mentioned conventional dynamic camber angle measuring method, (in the dynamic toe-in amount measuring method, the rollers are rotated in a horizontal plane), the rotating rollers are tilted until the thrust force in the rollers is reduced to zero whereupon such tilting angle is detected as the toe-in amount of the wheel.

SUMMARY OF THE INVENTION

The present invention relates to a device which can directly and dynamically detect camber angle and toe-in amount of vehicle wheels by bringing detection rollers into direct contact with vehicle wheels while maintaining the wheels in their rotating condition whereby the disadvantages inherent in the conventional camber angle and toe-in amount measuring methods can be effectively eliminated.

Therefore, one object of the present invention is to provide a device which can directly and automatically measure angles with high precision in a brief time.

Another object of the present invention is to provide a multi-purpose device which is compact and can be operated in combination with other testing devices, such as a speed testing device, a brake testing device, a horsepower-testing device and the like, for example.

A further object of the present invention is to provide a roller drive-type compound wheel alignment tester having detection rollers adapted to rotate in contact with the sides of vehicle wheels to be measured whereby vehicle wheel alignments (vehicle front wheel aligning conditions involving toe-in and camber angles) can be automatically and simultaneously measured with high precision in a brief time.

The above and other objects and attendant advantages of the present invention will be more readily apparent to those skilled in the art from a reading of the following detailed description in conjunction with the accompanying drawings which show one preferred embodiment of the invention for illustration purposes only, not to be taken as limiting the scope of the invention in any way.

BRIEF DESCRIPTION OF THE DRAWINGS

FIG. 3b is a fragmentary perspective view showing some parts of said measuring unit as shown in FIG. 3a;

FIG. 5 is an explanative view showing the camber angle measuring method employing the roller drive-type compound wheel alignment tester of the invention; and FIG. 6 is an elevational view on an enlarged scale showing various meter units.

PREFERRED EMBODIMENT OF THE INVENTION

Figure 1:
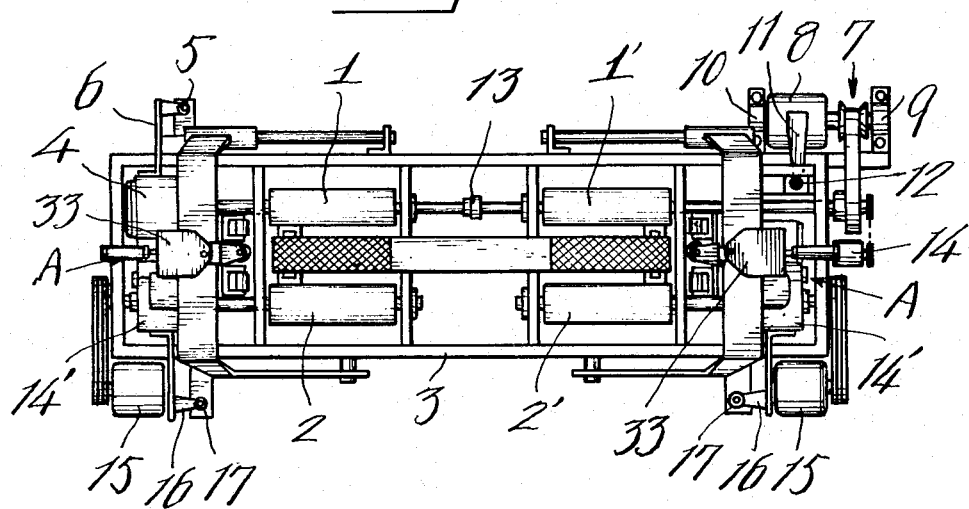
FIG. 1 is a plan view of one preferred form of roller drive-type compound wheel alignment tester constructed in accordance with the present invention.
Figure 2:
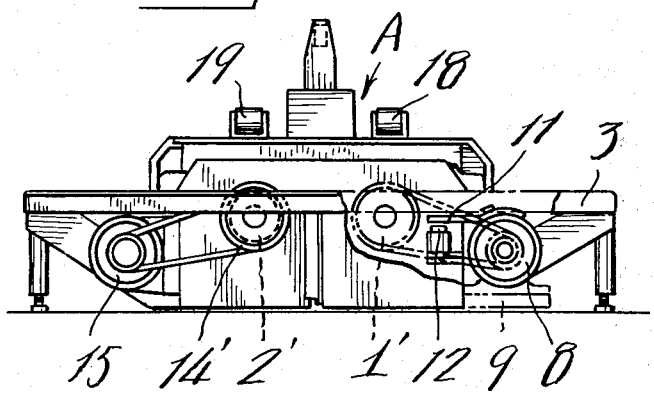
FIG. 2 is an end elevational view on an enlarged scale of said tester as seen from the right-hand side of FIG. 1.

The present invention will be now described referring to the accompanying drawings which show one preferred embodiment of the roller drive-type compound wheel alignment tester of the invention, for the purpose of illustration only. Reference numerals 1,2 and 1′, 2′ denote pairs of rollers on which the wheels of a vehicle whose toe-in alignment is to be measured ride. Rollers 1 and 2 form one pair for supporting one of the vehicle front wheels and the remaining rollers 1′ and 2′ form the other pair for supporting the other vehicle front wheel. The two pairs of rollers 1,2 and 1′,2′ are juxtaposed and journalled in a framework 3 by means of separate shafts and bearings, respectively.

An electric dynamometer 4 is connected through a chain coupling to the left end of the shaft of the roller 1 (as seen in FIG. 1) and a torque detector 5 is connected through a torque arm 6 to the electric dynamometer 4 for detecting the torque absorbed by the electric dynamometer. The output of the torque detector 6 is indicated on a torque meter 51 (see FIG. 6).

The shaft of the roller 1' has at the right-hand end (as seen in FIG. 1) a roller drive motor 8 connected thereto through a variable speed transmission 7. Motor 8 has it opposite ends journalled in the framework 3 by means of rocking bearings 9 and 10, respectively so that the motor 8 itself can rock. A torque detector 12 is connected to the motor 8 through a torque arm 11 extending from the casing of the motor. The output of the torque detector 12 which represents roller drive horsepower loss is read out by a horsepower meter 52 (see FIG. 6).

The dual purpose of the roller drive motor 8 is that firstly, when a speed test is conducted on a vehicle speed meter having a vehicle speed detector on a non-drive wheel, the motor forcibly drives the non-drive wheel through the rollers 1,2 and 1', 2' in pairs. Secondarily, when an output test is conducted on a vehicle, the horsepower loss of the rotary parts of the tester of the invention is determined so as to calculate the quasi-net horsepower of the vehicle.

The right-hand end of the shaft of the front roller 1' is connected through a chain to a rotation detector 14 which is in turn journalled in the framework 3 and the output of the detector is indicated on a speed meter 54 (see FIG. 6).

The front rollers 1 and 1' are normally connected together by means of a clutch 13 interposed between the opposite or inner ends of their shafts, but are disconnected from each other by disengaging the clutch when a brake test is conducted in the manner as will be described hereinafter. The remaining rear rollers 2 and 2' are operatively connected at the outer or right-hand ends of their shafts to separte drive motors 15,15 through their respectively associated planetary gearings 14' and 14'.

A torque arm 16 and a torque detector 17 are provided between each of the planetary gearings 14' and the framework 3 for detecting braking torque when the rear rollers 2,2' are braked by the vehicle wheels positioned thereon to be measured and the outputs of the detectors 17 which represent the braking forces of the left and right front vehicle wheels are determined by a braking force meter 53.

Figure 3A:
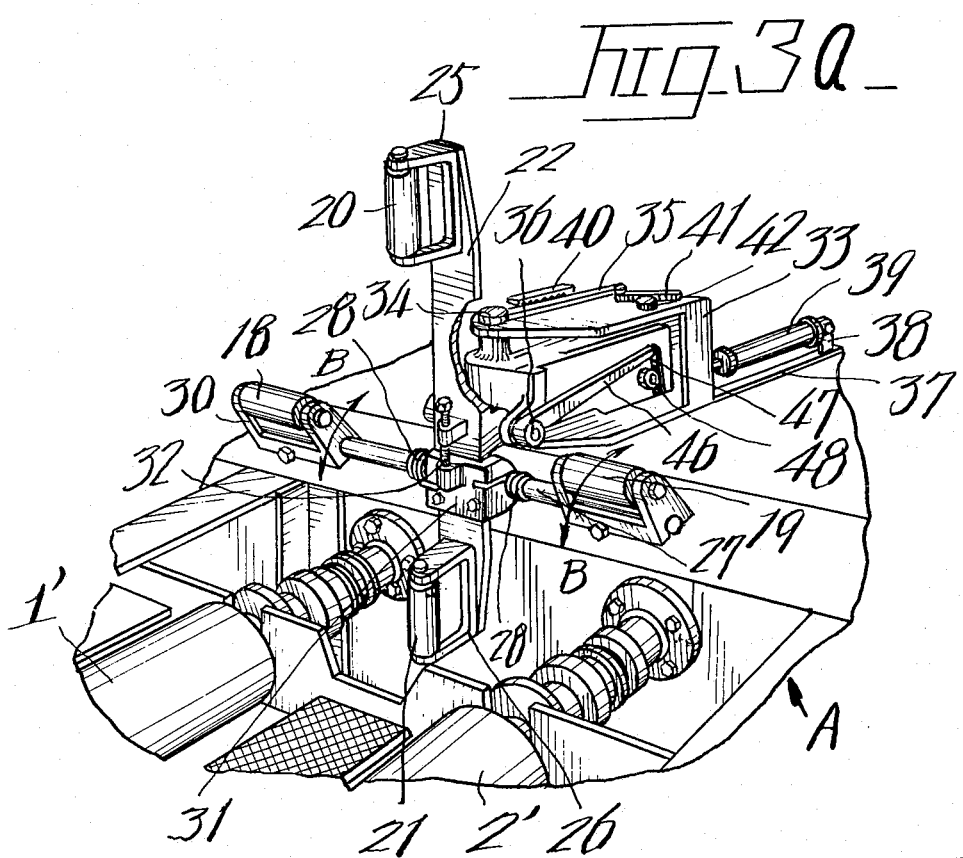
FIG. 3a is a fragmentary perspective view showing one wheel alignment measuring unit of said tester.
Figure 3B:
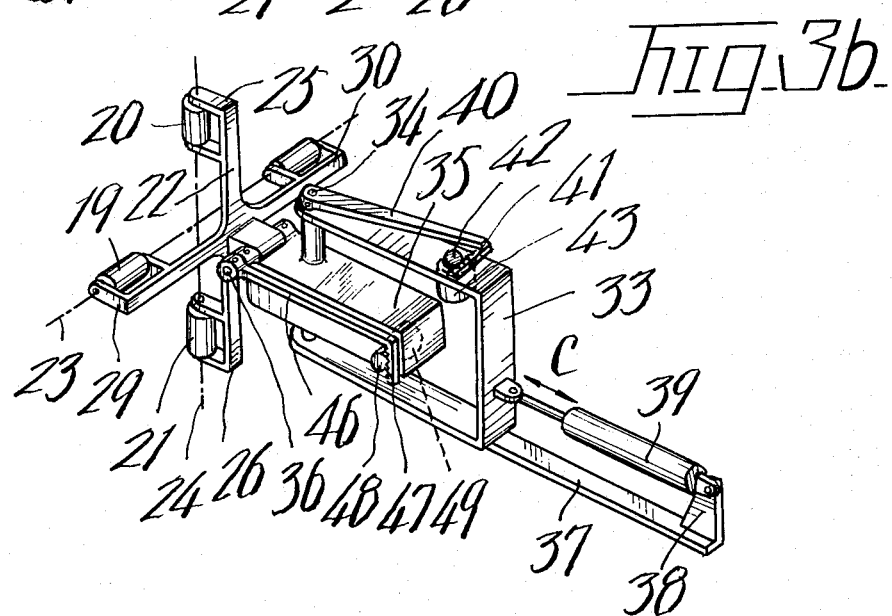

Reference characters A denote wheel alignment measuring units for the left and right front vehicle wheels and the details of these units will be described referring to FIG. 3 of the accompanying drawings.

FIGS. 4 and 5 are views showing the principle for measuring the wheel alignment and more particularly, the principles for measuring toe-in and camber angles of vehicle wheels.

Figure 4A:
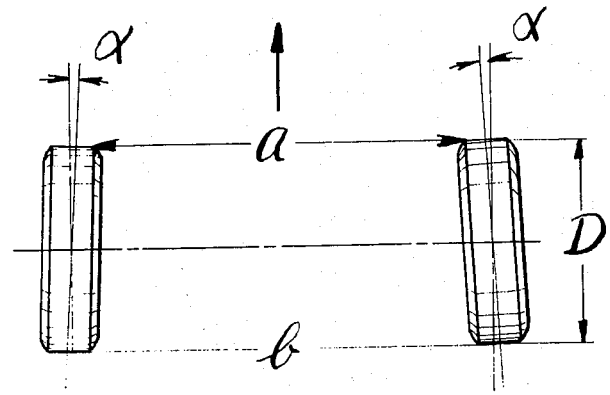
FIG. 4a is an explanative view showing the basic toe-in angle measuring method.
Figure 4B:
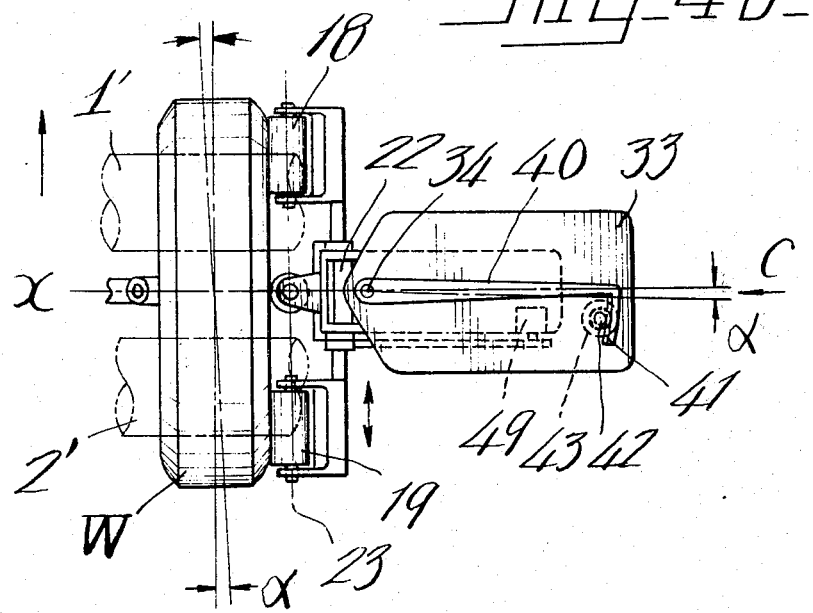
FIG. 4b is an explanative view showing the toe-in angle measuring method employing the roller drive-type compound wheel alignment tester of the invention.

First of all, the wheel alignment measuring principle will be described by referring to FIG. 4a in which the vehicle wheel toe-in amount is generally expressed by the dimension $b - a$. According to the present invention, toe-in amount is sought in relation to the diameter D of a vehicle wheel by measuring an inclining angle $\alpha$ of the wheel with respect to a straight line in the advancing direction of a vehicle, that is:

Toe-in amount $(b - a) = 2 D \sin \alpha$

The wheel inclining angle $\alpha$ (which will be referred to as "toe-in angle" hereinafter) can be measured by bringing front and rear spaced toe-in detection rollers 18 and 19 into contact with one or the outer side of a vehicle wheel to be measured and details of such measuring method will be described hereinafter.

Camber angle $\beta$ is expressed as being the inclining angle $\beta$ of a vehicle wheel to be measured with respect to a vertical line as seen in FIG. 5, and the inclining angle $\beta$ is directly measured by bringing front and rear spaced camber detection rollers 20 and 21 into contact with one or the outer side of the wheel.

One preferred embodiment of the wheel alignment measuring device of the invention will now be described in detail.

The wheel alignment measuring device of the invention is illustrated as a multi-purpose compound alignment tester which is capable of measuring the speed, braking force, horsepower (including quasi-horsepower), wheel alignment and the like and therefore, the device or tester has to be positioned in a position where the operation of other measuring devices including a braking force measuring device is not hindered.

Thus, in FIG. 1, the wheel alignment measuring device is shown as comprising two wheel alignment measuring units at A.

Referring to FIGS. 3a, 3b, 4b and 5 in which one wheel alignment measuring unit A associated with, for example the right-hand front wheel of a vehicle to be measured is shown. The front and rear spaced toe-in detection rollers 18,19 and upper and lower spaced camber detection rollers 20, 21 are rotatably mounted on the four arms of a cross-shaped support member 22 in such a manner that the horizontal axes of the toe-in detection rollers 18, 19 are aligned with each other and the vertical axes of the camber detection rollers 20,21 are aligned with each other and more particularly, the horizontal axis 23 lying in the projection of the axes of the rollers 18,19 and the vertical axis 24 lying in the projection of the axes of the rollers 20,21 intersect with each other and these axes also intersect the projection of the axis $\chi$ of the wheel W to be measured.

The reason for which the toe-in detection rollers 18, 19 are arranged in a horizontal plane and the camber detection rollers 20,21 are arranged in a vertical plane is due to the fact that the toe-in angle $\alpha$ is an angle in a horizontal plane and camber angle $\beta$ is an angle in a vertical plane. The reason for which the horizontal and vertical planes 23 and 24 which lie in the projections of the axes of the toe-in and camber detection rollers, respectively are disposed so as to intersect the axis of the wheel W is due to the fact that toe-in the camber angles can be precisely measured by such an arrangement.

The camber detection rollers 20,21 are rotatably supported on the support member 22 by means of brackets 25,26, respectively and are adapted to rotate in contact with the outer side of the wheel W.

The toe-in detection rollers 18,19 are rotatably supported on brackets 29, 30, respectively, supported on a common rotary horizontal shaft 27 which extends through and is rotatably supported by the support member 22 and a pair of springs 28,28 are disposed on the shaft 27 for normally urging the toe-in detection rollers 18,19 against the outer side of the wheel W so that the rollers can rotate in contact with the wheel.

In order that the detection rollers 18,19,20,21 may contact the wheel W with uniform pressure during a particular measuring operation, the toe-in detection rollers 18,19 are freely rotatably mounted on the shaft 27 through the brackets 29 and 30, respectively and allowed to rotate in the arrow direction B by a small distance against the force of the springs 28,28 after the rollers have been brought into contact with the wheel W.

If the toe-in detection rollers 18,19 are directly mounted on the support member 22 in the same manner as the mounting arrangement of the camber detection rollers 20,21, the wheel alignment unit A will have a four-point contact arrangement which renders it impossible to bring the four rollers into contact with the wheel W under a uniform pressure and in addition, simultaneous measurement of both toe-in and camber angles will not be able to be made by the toe-in and camber detection rollers on one support member 22. According to the present invention, the above-mentioned advantageous result may also be obtained by even reversing the roller mounting arrangement.

In the illustrated embodiment, the toe-in detection roller support shaft 27 is mounted on the support member 22 by means of a bracket 31 and a threaded shaft 32 so that the shaft 27 may move vertically for accomodating vehicle wheels having different dimensions.

Such vertical movement of the rotary shaft 27 can be made automatic by incorporating an electric motor and the like into the wheel alignment unit.

The support member 22 is capable of tilting about a horizontal shaft 36 which extends across a horizontally movable and rotatable frame 35 which horizontally rotates about a vertical shaft 34 extending vertically of a movable frame 33 which moves horizontally toward and away from the side of the wheel W (in the arrow C direction in FIGS. 4b and 5) under a constant force (about 15 kg.).

As the horizontally movable frame 33 moves in the arrow C direction toward and away from the wheel W to be measured, the detection rollers are brought into contact with the wheel W under a uniform pressure and separated from the wheel. The frame 33 is driven and guided along a guide track 37 provided on the frame 3 by an oil cylinder 39 which extends between the rear end of the frame 33 and a support bracket 38 fixedly mounted on the frame 3.

Thus, it will be understood that the horizontally movable frame 33 and detection roller support member 22 move as a unitary unit to bring the detection rollers into contact with the wheel W under a uniform pressure and separate the rollers from the wheel.

The vertical shaft 34 has a horizontal arm 40 secured to the upper end for indicating the horizontal rotational movement of the support members 22 in a magnified degree and the free end of the arm is bent into a L-shape to provide a rack 41.

A horizontal rotation angle detector 43 is fixedly mounted on the horizontally movable frame 33 for movement therewith and has a pinion gear 42 in mesh with the rack 41. The detector 43 provides its electrical output or signal to a horizontal rotation angle indication meter 45 or toe-in meter which gives an indication of the horizontal rotation angle of the roller support member 22. Thus, the roller support member 22, horizontal rotation frame 35 and arm 40 rotate together as one unitary unit to give an indication of the toe-in angle of the wheel W.

The toe-in meter 45 is set such that when the inclination angle $\beta$ of the wheel W to be measured has a value of zero in the contacting position of the toe-in rollers 18,19 (measuring position) with respect to the wheel W, the pointer of the toe-in meter will be in the 0 position.

When the wheel W has an inclination angle $\alpha$, the operator can read the value of the inclination angle $\beta$ against a particular toe-in amount ($b-a$) conversion table prepared for wheels having different dimensions, respectively. Alternatively, the meter 45 itself may be provided with a compensation graduation.

The horizontal shaft 36 has an arm 46 secured thereto at one end for indicating the inclination angle of the support member 22 on a magnified degree and the free end portion of the arm is bent into a L-shape to provide a rack portion 47 and an inclination angle detector 49 is fixedly mounted on the rotatable frame 35 for movement therewith and has a pinion gear 48 in mesh with the rack portion 47. The detector 49 gives a signal representing the detected inclination angle to an inclination angle meter 50 (FIG. 6) or a camber meter which indicates such detected inclination angle.

Thus, the detection roller support member 22 and arm 46 incline as an unitary unit about the horizontal shaft 36 for camber angle measurement and at the same time, rotate about the vertical shaft 34 whereby toe-in and camber angle measurements can be simultaneously and automatically made by the toe-in and camber detection rollers 18,19 and 20,21.

The same result can be obtained even if the positional relationship between the horizontal shaft 36 and vertical shaft 34 is reversed. In other words, in the illustrated embodiment, the vertical shaft 34 may be replaced by a horizontal shaft and similarly, the horizontal shaft 36 may be replaced by a vertical shaft. In such a case, the frame 35 will not rotate, but will incline and the toe-in angle detector 43 and camber angle detector 49 change their places with each other.

The camber meter 49 is so set that when the wheel W has zero inclination angle in the contacting position of the detection rollers with respect to the wheel (measuring position), the pointer of the meter will be in the zero value position on the meter's scale.

As a modified embodiment of the invention, it is also contemplated that the camber detection rollers 20,21 first detect the camber angle, the detection rollers are then rotated by 90° until their axes are positioned in a horizontal plane and set there and thereafter, the detection rollers detect the toe-in angle of the wheel. In such a case, simultaneous detection of toe-in and camber angles as described in the foregoing embodiment can not be conducted.

In operation, a vehicle is driven into the wheel alignment device of the invention until the vehicle front wheels are positioned on the pairs of rollers 1,2 and 1',2', respectively and the wheels are then rotated at a low speed by the roller drive motor 8.

The movable frames 33 are then horizontally moved toward each other by the oil pressure cylinders 39 until the camber detection rollers 20,21 contact the outer sides of the wheels with a uniform pressure whereupon the toe-in detection rollers 18,19, which are protruded beyond the plane in which the camber rollers 20,21 lie by the springs 28, come to contact with the wheels W against the force of the springs whereby the detection rollers follow the inclination to simultaneously rotate and incline thereby to give the indication of the detected inclination angle to the meters.

The operator then maneuvers the vehicle handle and corrects the orientation of the front wheels while watching the meter 45 until the right and left front wheels have the same toe-in angle. When the two front wheels assume the same toe-in angle, the vehicle will advance linearly. At this time, the toe-in angle and camber angle of the wheels can be simultaneously read out by the means of the toe-in meter 45 and camber meter 50.

When the wheel to be measured has irregularities thereon, the pointer of the meters may waver, but in such a case, an average value of each of the toe-in and camber angles can be obtained by reading the center of the wavering amplitude of the pointer. In such a case, when the axis 25 of the wheel to be measured does not intersect the projection 23 of the axes of the detection toe-in rollers or the projection 24 of the axes of the camber detection rollers, even if the center of the amplitude of the waver pointer is read out, such reading will not indicate any average value of the camber or toe-in angle. This is due to the fact that any toe-in or camber angle represents an angle with respect to a straight line containing the axis of a wheel to be measured. According to the present invention, any irregularity or irregularities on the wheel can be detected.

When the wheel alignment measuring operation has been completed, the wheel alignment units A are retracted from the wheels by the deenergization of the cylinders 39 for measurement of braking force, speed and output of the vehicle.

As is clear from the foregoing, according to the present invention, the single wheel alignment device is capable of performing measurements of braking force, speed and wheel alignment of a vehicle. And according to the present invention, since horsepower loss in rotary parts of the wheel alignment device (including the wheels not to be measured) can be measured, the measurement of any quasi-horsepower of a vehicle can be made by adding the above-mentioned horsepower loss to the absorption horsepower of the wattmeter.

Since the wheel alignment units are incorporated into a unitary structure, the setting of the units with respect to wheels to be measured can be made in one operation and toe-in and cambers angles can be simultaneously and automatically determined.

Since the movable frame 33, vertical shaft 34, rotatable frame 35, horizontal shaft 36, detection roller support member 22, the detector 43 in the movable frame 33 and the detector 49 in the rotatable frame 35 are incorporated into one wheel alignment unit, the wheel alignment unit can be made compact suitable for use in a compound wheel alignment tester.

Furthermore, according to the present invention, the above-mentioned arrangement of the detection rollers make it possible to measure toe-in and camber angles with high precision.

While only one preferred form of the invention has been shown and described in detail, it will be understood that the same is for the purpose of illustration only and is not to be taken as a definition of the scope of the invention as defined by the appended claims.

What is claimed is:

1. A roller drive-type compound vehicle wheel alignment tester comprising a pair of wheel alignment measuring units each including detection rollers adapted to rotate in contact with sides of vehicle wheels, characterized in that each of said wheel alignment measuring units comprises a horizontally movable and tiltable cross-shaped detection roller support member having four arms, two toe-in detection rollers supported respectively on two of said arms of the roller support member, two camber detection rollers supported respectively on the remaining two arms of said roller support member, with the projection of the axes of said two toe-in detection rollers intersecting the projection of the axes of said two camber detection rollers and with the projections of the axes of said toe-in and camber detection rollers intersecting the projection of the axis of one vehicle wheel to be measured, said toe-in detection rollers or camber detection rollers being rotatably mounted on said support member and the other detection rollers being rotatably mounted on said support member for movement by a small angular distance so as to contact one side of said vehicle wheel under a uniform pressure, a horizontally movable frame tiltably supporting said detection roller support member for movement therewith toward and away from said vehicle wheel under a certain force, said horizontally movable frame having a vertical shaft, a horizontally rotatable frame mounted in said horizontally movable frame for horizontal rotation about said vertical shaft and having a horizontal shaft about which said roller support member is tiltable, means for indicating inclination angle of said roller support member with respect to said horizontally rotatable frame and means for indicating horizontal rotation angle of said roller support member with respect to said horizontally movable frame.

2. A roller drive-type compound vehicle wheel alignment tester comprising a pair of wheel alignment measuring units each including detection rollers adapted to rotate in contact with sides of vehicle wheels, characterized in that each of said wheel alignment measuring units comprises a horizontally rotatable and tiltable cross-shaped detection roller support member having four arms, two toe-in detection rollers respectively supported on two colinear arms of the roller support member, two camber detection rollers supported respectively on the remaining two arms of said roller support member, with the projection of the axes of said two toe-in detection rollers intersecting the projection of the axes of said two camber detection rollers and with the projections of the axes of said detection rollers intersecting the projection of the axis on one vehicle wheel to be measured, said toe-in detection rollers or camber detection rollers being rotatably mounted on said roller support member and the other detection rollers being rotatably mounted on said roller support member for movement by a small distance so as to contact one side of said vehicle wheel under a uniform pressure, a horizontally movable frame tiltably supporting said detection roller support member for movement therewith toward and away from said vehicle wheel under a certain force, said horizontally movable frame having a horizontal shaft, a tiltable frame, mounted in said horizontally movable shaft for tilting movement about said horizontal shaft and having a vertical shaft about which said roller support member is horizontally rotatable, means for indicating inclination angle of said roller support member with respect of said horizontally movable frame and means for indicating rotation angle of said roller support member with respect to said tiltable frame.

3. A roller drive-type compound vehicle wheel alignment tester comprising a pair of wheel alignment measuring units each including detection rollers adapted to rotate in contact with sides of vehicle wheels, characterized in that each of said wheel alignment units comprises a horizontally movable and tiltable cross-shaped detection roller support member having four arms, two toe-in and two camber detection rollers supported respectively on opposing arms of the roller support member with the projection of the axes of said two toe-in detection rollers intersecting the projection of the axes of said two camber detection rollers and with the projections of the axes of said toe-in and camber detection rollers intersecting the projection of the axis of one vehicle wheel to be measured, said toe-in detection rollers or camber detection rollers being rotatably mounted on said roller support member and the other detection rollers being rotatably mounted on said roller support member for movement by a small distance so as to contact one side of said vehicle wheel under a uniform pressure, a horizontally movable frame tiltably supporting said detection roller support member for movement therewith toward and away from said vehicle under a certain force, said horizontally movable frame having a vertical shaft, a horizontally rotatable frame mounted in said horizontally movable frame for horizontal rotation about said vertical shaft and having a horizontal shaft about which said roller support member is tiltable, means for indicating inclination angle of said roller support member with respect to said horizontally rotatable frame and means for indicating horizontal rotation angle of said roller support member with respect to said horizontally movable frame, and said tester further comprises a roller drive motor for determining horsepower loss in rotary parts of said tester and means for detecting reaction torque from said roller drive motor.

* * * * *